(12) United States Patent
Gaunt et al.

(10) Patent No.: US 9,692,800 B2
(45) Date of Patent: Jun. 27, 2017

(54) ENHANCED STREAMING MEDIA PLAYBACK

(71) Applicant: Google Inc., Mountain View, CA (US)

(72) Inventors: Robert Christopher Gaunt, Pacifica, CA (US); Pavel Pergamenshchik, San Bruno, CA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 14/302,244

(22) Filed: Jun. 11, 2014

(65) Prior Publication Data

US 2015/0365450 A1 Dec. 17, 2015

(51) Int. Cl.
| | |
|---|---|
| *G06F 15/16* | (2006.01) |
| *H04L 29/06* | (2006.01) |
| *H04L 29/08* | (2006.01) |
| *H04N 21/262* | (2011.01) |
| *H04N 21/482* | (2011.01) |
| *H04N 21/61* | (2011.01) |
| *H04N 21/6371* | (2011.01) |
| *H04N 21/6377* | (2011.01) |

(52) U.S. Cl.
CPC ........ *H04L 65/4084* (2013.01); *H04L 65/608* (2013.01); *H04L 65/80* (2013.01); *H04L 67/02* (2013.01); *H04N 21/26258* (2013.01); *H04N 21/4825* (2013.01); *H04N 21/6125* (2013.01); *H04N 21/6371* (2013.01); *H04N 21/6377* (2013.01)

(58) Field of Classification Search
CPC .................................................. H04L 65/4069
USPC .......................................................... 709/231
See application file for complete search history.

(56) References Cited

U.S. PATENT DOCUMENTS

| | | | |
|---|---|---|---|
| 8,812,579 B2 * | 8/2014 | Rivera ................ | H04L 63/0227 705/38 |
| 2007/0282898 A1 * | 12/2007 | Stark ...................... | H04H 20/10 |
| 2012/0047542 A1 * | 2/2012 | Lewis .............. | H04N 21/44016 725/97 |

(Continued)

OTHER PUBLICATIONS

Pantos et al., "HTTP Live Streaming draft-pantos-http-live-streaming-12" Apple Inc. Oct. 14, 2013, 43 pages [Online], [retrieved Feb. 2, 2015], Retrieved from the Internet, <http://tools.ietf.org/html/draft-pantos-http-live-streaming-12>.

(Continued)

*Primary Examiner* — Viet Vu
(74) *Attorney, Agent, or Firm* — Fenwick & West LLP

(57) ABSTRACT

A streaming video playback system is provided to generate locally a manifest file associated with a streaming video for a media player of a client device. The locally generated manifest file helps reduce startup time for the media player and the manifest file is locally generated based on streaming metadata associated with the streaming video and the manifest files includes HTTP Live Streaming (HLS) based master playlists and media playlists. The locally generated manifest file also provides better adaptive bit rate control by enabling pre-fetching of video segments of a streaming video and caching during playback. The streaming video playback system reduces the size of media playlist transmitted to a content sharing service using index of the last video segment and makes it practical to have DVR-able live video streaming with a larger seek window.

30 Claims, 4 Drawing Sheets

(56) References Cited

U.S. PATENT DOCUMENTS

2012/0278497 A1* 11/2012 Hsu .................. H04L 65/604
709/231
2014/0359081 A1* 12/2014 Van Deventer .... H04N 21/6587
709/219

OTHER PUBLICATIONS

"Resolving App Store Approval Issues for HTTP Live Streaming", Apple Inc., Last updated Jul. 7, 2014, 3 pages, [Online], [retrieved Feb. 2, 2015]. Retrieved from the Internet, <https://developer.apple.com/library/ios/qa/qa1767/_index.html>.
ISO/IEC TR 23009-3: 2015, "Information technology—Dynamic adaptive streaming over HTTP (DASH)—Part 3: Implementation guidelines," Second Edition, Oct. 15, 2015, 66 Pages.

\* cited by examiner

ENHANCED STREAMING MEDIA PLAYBACK

TECHNICAL FIELD

The disclosure relates generally to the field of digital media streaming, and specifically to enhancing streaming media playback.

BACKGROUND

The development of digital media content sharing and Internet networking has enabled many features to enhance the user experience. For example, on the Internet, content hosting websites and content sharing services allow users to upload, view and share digital media content, which may include audio/music clips, video clips and combination of audio and video content. A viewer can view the media content that is streamed from a content sharing server to a viewing device for playback. To prevent buffering that disrupts the playback of the media content playback, the content may be streamed with an adaptive bitrate protocol such as HTTP Live Streaming (HLS).

HLS is a network protocol for streaming audio and video over HTTP from a web server for playback on various computing devices, where the quality of the streaming content can be changed depending on the network connection of the viewing device. However, existing HLS based solutions for streaming media playback face a number of challenges. The first challenge is high latency. For example, existing HLS based solutions require a client device to make three round trips to a content sharing server before the client device can play back any video content. The three round trips include a trip to fetch a master playlist, one trip for a media playlist and one trip for an initial media segment. Such requirement substantially increases the latency for content playback especially in situations where the round trip time (RTT) is high such as on wireless networks.

Existing solutions for streaming media playback, e.g., HLS or DASH, also lack client control over stream selection when the media player used by a client does not support streams selection. For example, clients using such a media player for streaming video using HLS protocol are unable to control which media segments to fetch and when to fetch them. If a streaming video is available in multiple bitrates or resolutions, the clients are required to provide a master playlist URL to a media player, where the master playlist contains all available media playlists, each of which corresponds to a representation of the streaming video in a specific bitrate or resolution. During the playback, the media player decides which representation of the streaming video to choose for playback.

Furthermore, existing solutions for streaming video content playback are not efficient to support live video streaming. During live playbacks of streaming media, the client of existing HLS based streaming video solutions need to re-fetch the live playlist every several seconds for new media segments. If the client is permitted to seek back in time, the live media playlist must contain the entire sought duration of the content, which makes the live media playlist large to store, increasing the cost to store and parse the playlist.

SUMMARY

Described embodiments enable enhanced user experience with streaming video content playback. A manifest file associated with a streaming video for a media player of a client device is generated locally at a streaming video playback system. Generating the manifest file or manifest files locally from streaming metadata helps to reduce startup time by reducing the number of round trips over the network to the content sharing service. A proxy server, through the locally generated manifest file, provides better adaptive bit rate control by enabling pre-fetching of video segments of a streaming video and caching during playback. The streaming video playback system reduces the size of the media playlist transmitted to a content sharing service using an index of the last video segment and makes it practical to have DVR-able live video streaming with a larger seek window.

One embodiment includes a streaming video playback system, which comprises a proxy server for a media player of a client device. The proxy server detects requests for streaming videos from the media player to a content sharing service, such as YouTube. The content sharing service provides streaming metadata to the streaming video playback system. The streaming metadata may be in a standard form, e.g., according to a streaming protocol understood by the media player, such as HLS or DASH. The streaming metadata may be in a custom form, such as a protocol buffer. The streaming video playback system transforms the streaming metadata into a manifest file or set of manifest files, which conform to the streaming protocols understood by the media player.

The proxy server modifies the request so that the proxy server gets response data in a different format from the content sharing service, e.g., transforming the file format of the request for more compact representation and easy parsing of the response data, and provides the modified request to the content sharing service. Upon receiving streaming data associated with the requested video from the content sharing service, the proxy server generates a manifest file or a set of manifest files for the video depending on the type of the streaming protocol. In the case of HLS streaming protocol, the manifest files are a HLS master and media playlists. In case of DASH, the manifest files are DASH manifests. A manifest file may include information describing location of the video, a list of available representations of the video and a list of video segments for each available representation of the video. The proxy server provides the manifest file to the media player for streaming content of the requested video from the content sharing service. Alternatively, the proxy server streams the content of the requested video from the content sharing service for the media player.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Figure 1:
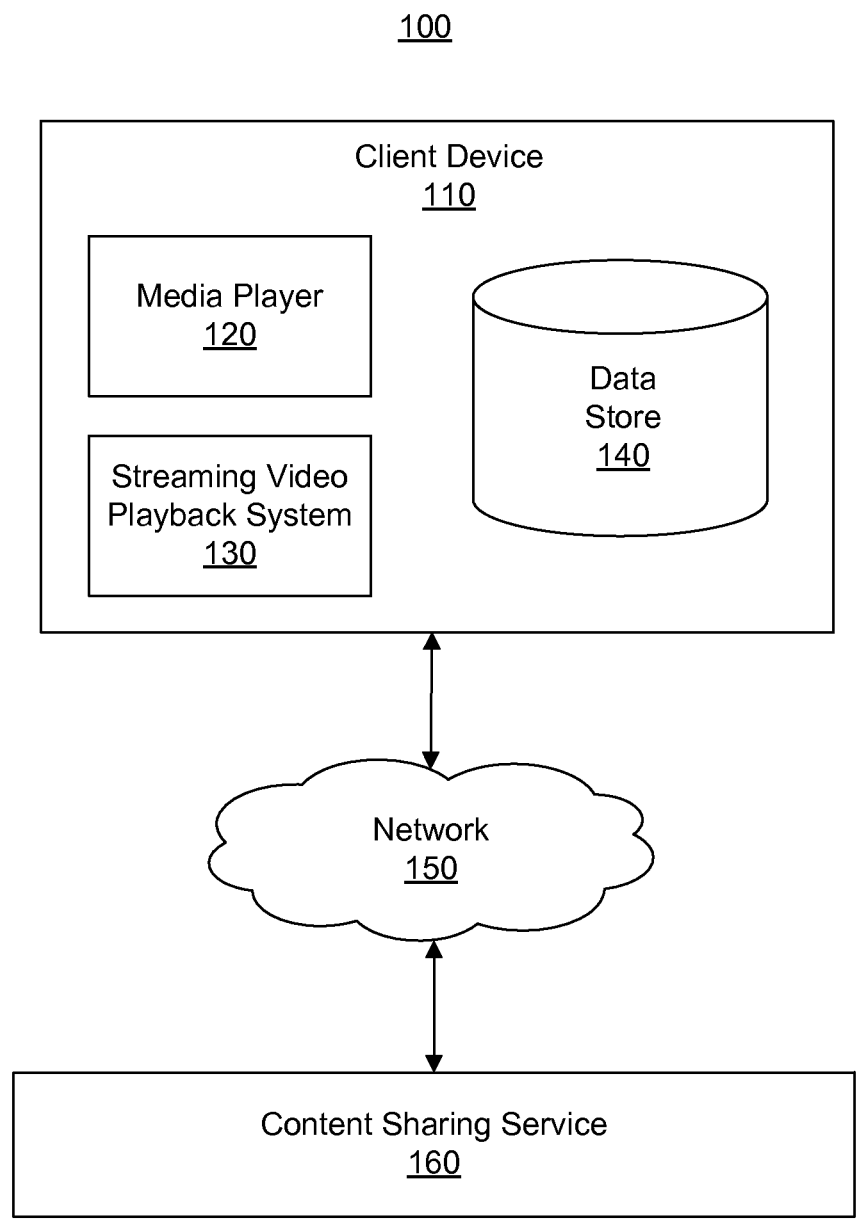
FIG. 1 is a block diagram of a computing environment for enhancing streaming video playback according to one embodiment.

FIG. 1 shows a computing environment 100 for enhancing streaming video playback according to one embodiment. The computing environment 100 includes a client device 110 connected to a content sharing service 160 through a network 150. Only one content sharing service 160 and one client device 110 are shown in FIG. 1 to simplify and clarify the description. Implementations of the computing environment 100 can have many client devices 110 and content sharing services 160 connected via the network 150. Likewise, the functions performed by the various entities of FIG. 1 may differ in different embodiments.

The client device 110 and the content sharing service 160 may be any type of computing device, for example, a device including a computer processor and a memory (e.g., a computer-readable storage medium). The content sharing service 160 or the client device 110 may include computing devices that have a wide range of processing capabilities such as a personal computer (PC), a server computer, a personal digital assistant (PDA), a smart phone, a laptop computer, a notebook computer, a tablet device or any machine capable of executing a set of computer program instructions that specify actions to be taken by the machine. Embodiments of the disclosure may operate within a single server device or multiple server devices.

In one embodiment, the content sharing service 160 provides digital content such as video content to be streamed to the client device 110. For example, the content sharing service 160 may provide a media item, such as a streaming video, requested by a user for playback on the client device 110 via the network 150. A suitable system for implementation of the content sharing service 160 is the YouTube™ website, found at www.youtube.com; other video hosting sites are known as well, and can be adapted to operate according to the teaching disclosed herein. It will be understood that the term "site" represents any computer system adapted to serve digital media content using any internet-working protocols, and is not intended to be limited to content uploaded or downloaded via the Internet or the HTTP protocol.

In this disclosure, "digital content" or "digital media content" generally refers to any machine-readable and machine-storable work. Digital content can include, for example, video, audio or combination of video and audio. For purposes of simplicity and the description of one embodiment, the digital content for playback will be referred to as a "video," "streaming video," "video files," or "video items," but no limitation on the type of digital content that can be streamed and played back are indented by this terminology. Thus, the operations described herein for playing back streaming video content can be applied to any type of digital content, including videos and other suitable types of digital content such as audio files (e.g. music, podcasts, audio books, and the like), documents, websites, images, multimedia presentations, and others.

The network 150 enables communication between the content sharing service 160 and the client device 110 and may be the Internet, another wide area network, a local area network, or the like. The various communication technologies and protocols for network implementation may be selected from among conventionally known methodologies. In one embodiment, the communication protocol for the communications between the content sharing service 160 and the client device 110 is HTTP Live Streaming (HLS) for streaming video content. Other communication protocols for streaming video such as Dynamic Adaptive Streaming over HTTP (DASH) can also be used for network implementation.

The client device 110 sends streaming video requests to the content sharing service 160, retrieves video segments and associated metadata from the content sharing service 160 and plays back the video content at the client device 110. In one embodiment, the client device 110 includes a media player 120, a streaming video playback system 130 and a data store 140. Other embodiments of the client device 110 may have other elements or other computer modules adapted to communicate over Internet related protocols (e.g., TCP/IP and HTTP). The client device 110 may include interfaces with a display device on which the user may view video content.

The media player 120 allows a user of the client device 110 to view digital content. In one embodiment, the media player 120 is a web browser that can access, retrieve, present and navigate digital content served by the content sharing service 160. The media player 120 may render, display and present digital content to a user. The media player 120 may also be an embedded media player (e.g., Flash® player or an HTML5 player) that is embedded in a web page. In another example, the media player 120 may be a standalone application that allows users to view digital media items (e.g., digital videos, digital images and electronic books). In another example, the media player 120 is a framework (e.g., a set of application program interfaces (APIs)) provided by a mobile operating system.

In one embodiment, the media player 120 sends requests for streaming videos to the content sharing service 160 and obtains video segments of the requested streaming videos for playbacks. The media player 120 caches the obtained streaming video content in the data store 140 and plays back the streaming video content on a display device of the client device 110. In another embodiment, the streaming video playback system 130 functions as a proxy for the media player 120 to send requests for streaming videos and to obtain the requested streaming video content.

The data store 140 stores video content and/or metadata for playbacks on the client device 110. In one embodiment, the data store 140 includes one or more computer writable persistent storage devices, such as memories, tapes and disks. Examples of the devices may include, but are not limited to, computer servers, mainframe computers, networked computers, process-based devices and similar type of systems and devices. In one embodiment, the data store 140 stores video content and corresponding metadata streamed from the content sharing service 160.

The client device 110 can include a streaming video playback system 130 to facilitate playback of streaming video content. The streaming video playback system 130 detects requests for a streaming video from a user of the media player 120, fetches video segments of the requested video from the content sharing service 160 or the data store 140, stores or caches the video segments in the data store 140 (if not already cached) and provides the video segments to the media player 120 to play back. The streaming video playback system 130 is further described with references to FIGS. 2-5.

Figure 2:
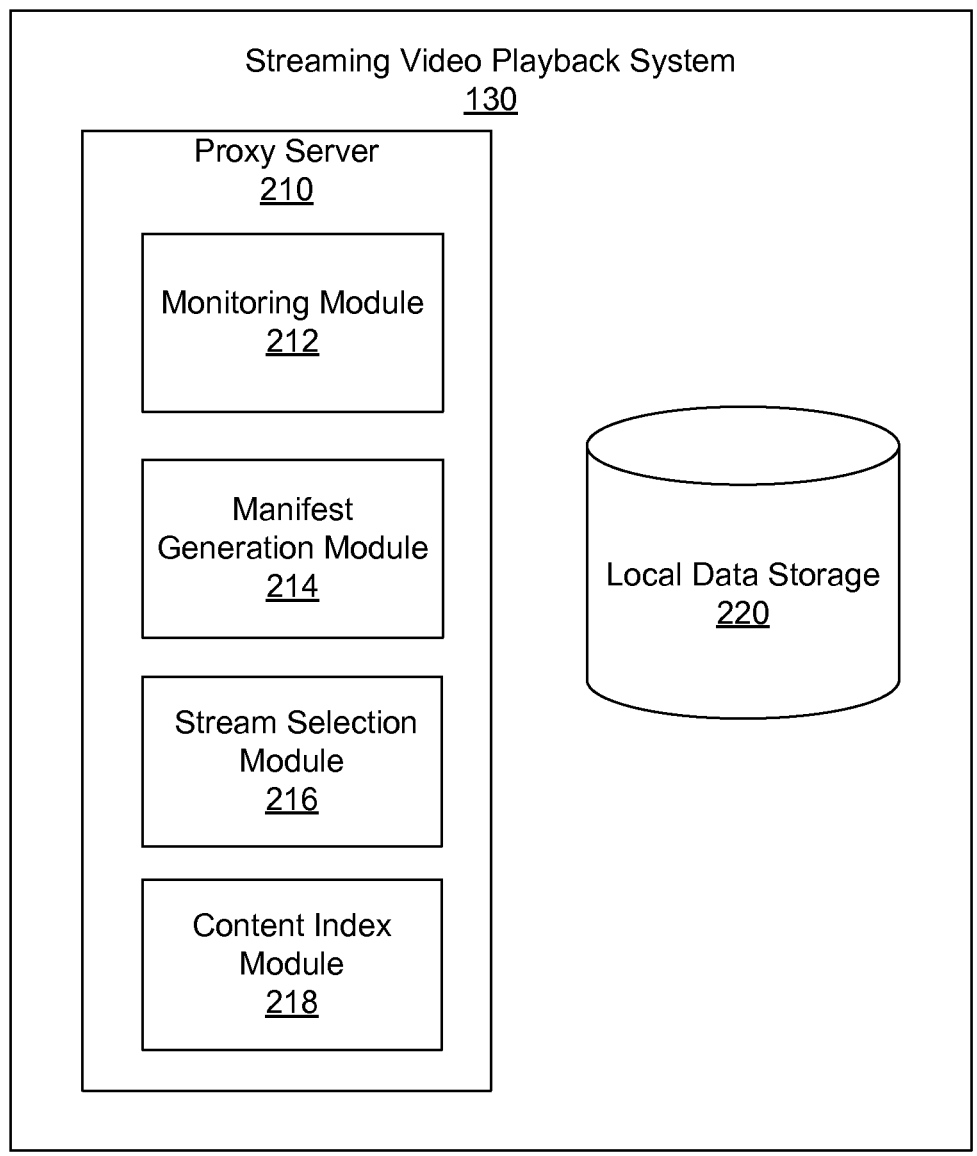
FIG. 2 is an exemplary streaming video playback system according to one embodiment.

FIG. 2 is an exemplary streaming video playback system 130 according to one embodiment. In the embodiment illustrated in FIG. 2, the streaming video playback system 130 has a proxy server 210 and a local data storage 220. In one embodiment, the streaming video playback system 130 may not include the local data storage 220 and the proxy server 210 uses the data store 140 to store obtained streaming content or metadata. The proxy server 210 detects requests for streaming videos sent by the media player 120 of the client device 110 and sends the requests on behalf of the media player 120. The proxy server 210 obtains the requested streaming video content (e.g., by downloading the requested streaming video content) from the content sharing service 160 and stores the obtained streaming video content in the local data storage 220.

The local data storage 220 stores video content of requested streaming videos and corresponding metadata. In one embodiment, for a requested streaming video, the local data storage 220 stores partial or entire content of the requested video. A portion of the video content is stored as one or more video segments; each video segment has multiple video frames of the streaming video and each video segment corresponds to a part of the streaming video, e.g., 10 seconds each. A video segment of a streaming video is identified by a segment identification (ID). A video segment of a streaming video can also have an index indicating its position in the streaming video, e.g., $10^{th}$ segment of the streaming video on a media playlist.

The local data storage 220 also stores metadata needed for local generation of the manifest file(s) for each requested streaming video. For example, the metadata for a streaming video may include the duration for each video segment, the overall duration of the streaming video, metadata about the video coding (e.g., MIME type) and other information. The manifest file of a streaming video generated by the proxy server 210 includes a master playlist, which provides a URL of the streaming video and the URL identifies the location at the content sharing service 160 or a location at the proxy server 210 for downloading the streaming video. The manifest file(s) may additionally include one or more media playlists, each of which identifies a representation of the streaming video of a particular visual quality. For example, if the streaming video is available in three resolutions, e.g., 240p, 360p and 480p, the manifest may include three media playlists, each of which represents the streaming video in one of the three resolutions. The manifest file may further include a list of video segments of the stream video on a media playlist.

The proxy server 210 illustrated in FIG. 2 has a monitoring module 212, a manifest generation module 214, a stream selection module 216 and a content index module 218. The proxy server 210 supports HTTP Live Streaming protocol for streaming video from the content sharing service 160 to the media player 120. Other embodiments of the proxy server 210 can have different or additional modules over different communication protocols.

The monitoring module 212 monitors the communications between the media player 120 and the content sharing service 160. In one embodiment, the monitoring module 212 intercepts requests for streaming videos from the media player 120 to the content sharing service 160. A request for a streaming video from the media player 120 identifies the requested streaming video. Upon intercepting a request for a streaming video, the monitoring module 212 communicates the original request or a modified original request with the content sharing service 160 to request streaming data of the requested video, e.g., issuing an application programming interface (API) function call to the content sharing service 160. Responsive to receiving the requested streaming data from the content sharing service 160, the monitoring module 212 provides the received streaming data to the manifest generation module 214 for further processing.

In one embodiment, the requested streaming data includes a location indicator (e.g., URL) of an index file associated with the streaming video. The index file associated with a streaming video is located at the content sharing service 160 and the index file contains a list of playlists, which contain URLs pointing to the actual media content of the requested streaming video. The index file is also referred to as master playlist file.

The requested streaming data may also include one or more media playlists associated with the requested streaming video. Each media playlist associated with the requested streaming video identifies one available representation of the streaming video of a particular visual quality. Representations may include different audio representations as well. In addition to differences in quality, alternate representations may include alternate language tracks (for audio representations) or different camera angles (for visual representations). The visual quality of a streaming video can be measured in terms of bit rate, resolution, number of frames per second, encoding format, peak signal-to-noise ratio (PSNR) or other visual features. For example, if the requested video is available in three resolutions, e.g., 240p, 360p and 480p, the requested streaming data may include three media playlists, one for each resolution. The requested streaming data may also include other metadata of the requested streaming video, e.g., encryption keys if the streaming data is encrypted.

In one embodiment, the monitoring module 212 transforms the file format of the request for a streaming video from the media player 120 to a different file format for more compact representation or easy parsing of the streaming data. The file format transformation enables the proxy server 210 to request streaming data of a different format than the original format of the request. For example, a request for a streaming video to the content sharing service 160 from the media player 120 is in a standard ".m3u8" file format of HLS protocol. The monitoring module 212 transforms the ".m3u8" file format to an internal representation for receiving the streaming data, e.g., a protocol buffer representation, which is more compact in the format and requires less bandwidth for transmitting to receive the streaming data.

The manifest generation module 214 receives the requested streaming data associated with a streaming video and generates a manifest file for the requested streaming video. In one embodiment, the manifest file includes the URL of the master playlist for the requested streaming video. In another embodiment, the manifest file includes the URL of the master playlist for the requested streaming video and the media playlists associated with the streaming video. In yet another embodiment, the manifest file includes the URL of the master playlist, the media playlists for the requested streaming video and a list of video segments associated with the requested streaming video.

In one embodiment, the manifest generation module 214 generates the manifest file for a streaming video in a file format different from the file format of the received streaming data. For example, the received streaming data from the content sharing service 160 is in an internal file format for more compact representation and efficient transmission. The manifest generation module 214 transforms the internal file format to ".m3u8" file format or a file format understood by the media player 120. Generating the manifest file for a streaming video locally at the proxy server 210 reduces the number of round trips from the media player 120 to the content sharing service 160, which, in turn, reduces the latency for playing back the streaming video content.

The stream selection module 216 enables users of the media player 120 to control streaming video quality, a feature that enhances user experience with streaming video content playbacks. In particular, the streaming selection module 216 allows users of the media player 120 to control which video segments to fetch or download and when to fetch the video segments. In one embodiment, the streaming selection module 216 provides a user interface that presents a list of available representations of a requested streaming video. The available representations of the requested streaming video represent different visual qualities of the requested video. For example, a representation of the streaming video in high resolution generally represents high visual quality. The streaming selection module 216 receives user selection of a visual quality of the requested streaming video through the user interface and fetches the video segments that have the user selected visual quality from the content sharing service 160. For example, responsive to a user selection of a high resolution among available resolutions, the streaming selection module 216 fetches video segments which have the required resolution.

The streaming selection module 216 supports adaptive bit rate streaming. In one embodiment, the streaming selection module 216 augments the user selection of visual quality of a requested video based on network conditions, e.g., network connection speed and loss rate of streaming data packets. Responsive to a user selection of high visual quality streaming data, but poor network connection, the streaming selection module 216 may fetch the video segments of lower visual quality for playback. The streaming selection module 216 may fetch and cache high visual quality video segments at some point in the future when the network condition is better, and replace the low visual quality video segments with the corresponding high visual quality video segments for subsequent playbacks if needed.

To further enhance user experience with streaming video content playback, the streaming selection module 216 provides a master playlist with a media playlist, which indicates a type of visual quality of a requested streaming video. The requested streaming video indicated by the media playlist is not a fixed bitrate video stream, but a proxied playlist where each video segment URL included in the media playlist points to the proxy server 210. The streaming selection module 216 can make the determination, at the time a video segment at a particular position is fetched, which representation of the requested streaming video to choose from. The streaming selection module 216 downloads the video segment for the chosen representation from the content sharing service 160 or from the local data store 140 and serves the video segment to the media player 120.

The proxy server 210, via the streaming selection module 216, enables user control over the requested streaming video content by removing video stream selection choice and control over video segments fetches from the media player 120. For example, the provided master playlist for a requested streaming video contains only a single audio and single video representation. By taking away all choice from the media player, it allows the proxy server 210 to intercept the audio or video request and choose which media representation to substitute in. Additionally, providing the master playlist with a media playlist as described above also provides the following benefits to users of streaming video:

Manual visual quality selection—the streaming selection module 216 may choose a particular visual quality based on user input rather than conventional adaptive bit rate control logic for HLS streaming protocol;

Low latency for video segment fetch—the streaming selection module 216 may choose to serve pre-fetched video segments saved in a local storage/cache instead of downloading the video segments over network to reduce latency;

Control over buffering behavior—the streaming selection module 216 may pre-fetch video segments when the video segments are identified in a request for the associated streaming video and serve the pre-fetched video segments from a local storage when requested for playback;

Better battery use through better scheduling of requests for streaming videos—the streaming selection module 216 may pre-fetch a number of video segments for instant playbacks in addition to a number of video segments for future playbacks. The pre-fetching of video segments by the streaming selection module 216 makes better use of battery of the client device 110 and improves the battery life accordingly.

The content index module 218 keeps track of the last video segment in a media playlist associated with a live streaming video and reduces the cost of media playlist refreshes. In one embodiment, the content index module 218 assigns an index for each video segment on a media playlist based on interactions with the content sharing service 160 and records the index of the last video segment in an internal representation of the media playlist. The index of a video segment may be represented by a time stamp of the video segment relative to the entire duration of the video. The content sharing service 160 receives the overall duration of the live streaming, starting time of the live streaming and time stamps associated with the live streaming video. The content sharing service 160 determines the time stamp or index for the last video segment on a media playlist and provides such determination to the content index module 218. The content index module 218 may query the content sharing service 160 for update on the index of the last video segment when requesting for new video segments, and the content sharing service 160 returns only the new video segments (i.e., the last video segment and subsequent video segments of the streaming video) to the proxy server 210.

The proxy server 210 through the content index module 218 improves performance of DVR-enabled live video streaming. A DVR-enabled live stream is a video stream where a client device may seek back in time. To support DVR-enabled live video streaming, each media playlist must contain the entire set of video segments which the client device may seek to. If the live video stream is long (e.g., a few hours), this represents a large amount of data to be downloaded and stored. During the live playbacks, the client device must re-fetch the live media playlist every several seconds for new segments. The proxy server 210 reduces the size of media playlist transmitted to the content sharing service 160 using index of the last video segment and makes it practical to have DVR-able live video streaming with a larger seek window.

Figure 3:
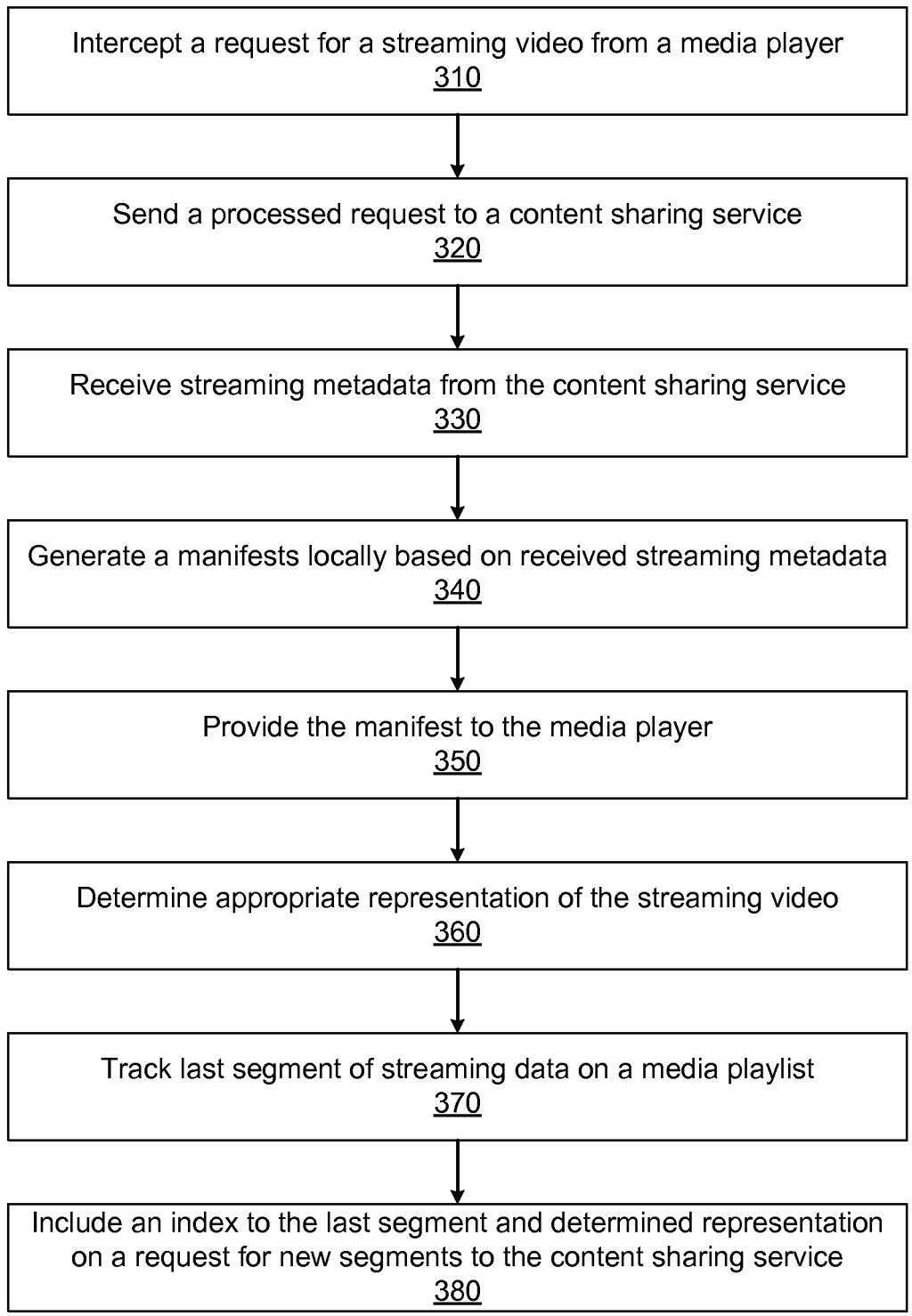
FIG. 3 is a flowchart illustrating a process for enhancing streaming video playback according to one embodiment.

FIG. 3 is a flowchart illustrating a process for enhancing streaming video playback by the streaming video playback system 130 according to one embodiment. Initially, the streaming video playback system 130 intercepts 320 a request for a streaming video from a media player of a client device, e.g., the media player 120 of the client device 110. The request identifies the requested streaming video, e.g., the URL of the streaming video. The streaming video playback system 130 processes the request, e.g., transforming the file format of the request such that the streaming video playback system 130 is able to receive the streaming data in a different file format for more compact representation, and sends 320 the processed request to a content sharing service, e.g., the content sharing service 160 in FIG. 1.

The streaming video playback system 130 receives 330 streaming metadata from the content sharing service. The streaming metadata may include the URL of the streaming video in a form of master playlist. The master playlist includes one or more media playlists, each of which corresponds to a representation of the streaming video in particular visual quality. The streaming video playback system 130 generates 340 a manifest file based on the received streaming metadata. The manifest file may include the master playlist, a media playlist and a list of video segments associated with the media playlist. The streaming video playback system 130 provides 350 the manifest file to the requesting media player to download the video segments of the requested streaming video. Alternatively, the streaming video playback system 130 acts as a proxy for the media player and downloads the video segments for the media player.

To enable user control over streaming video playbacks in terms of which video segments to fetch and when to fetch them, the streaming video playback system 130 determines appropriate representation of the streaming video using adaptive bit rate streaming. The streaming video playback system 130 may make the determination based on user input or network conditions. The appropriate representation of the streaming video has the desirable visual quality for playbacks of the streaming video on the client device.

The streaming video playback system 130 also tracks 370 the last video segment of a media playlist for the streaming video in the determined representation. The streaming video playback system 130 can assign an index to the last video segment based on interactions with the content sharing service 160. The streaming video playback system 130 includes 380 the index to the last video segment and determined representation of the streaming video in a request for new segments to the content sharing service. Keeping track of the last video segment allows the streaming video playback system 130 to request only new video segments that have not been downloaded by the streaming video playback system 130 and enables DVR-enabled live video streaming with improved performance.

Figure 4:
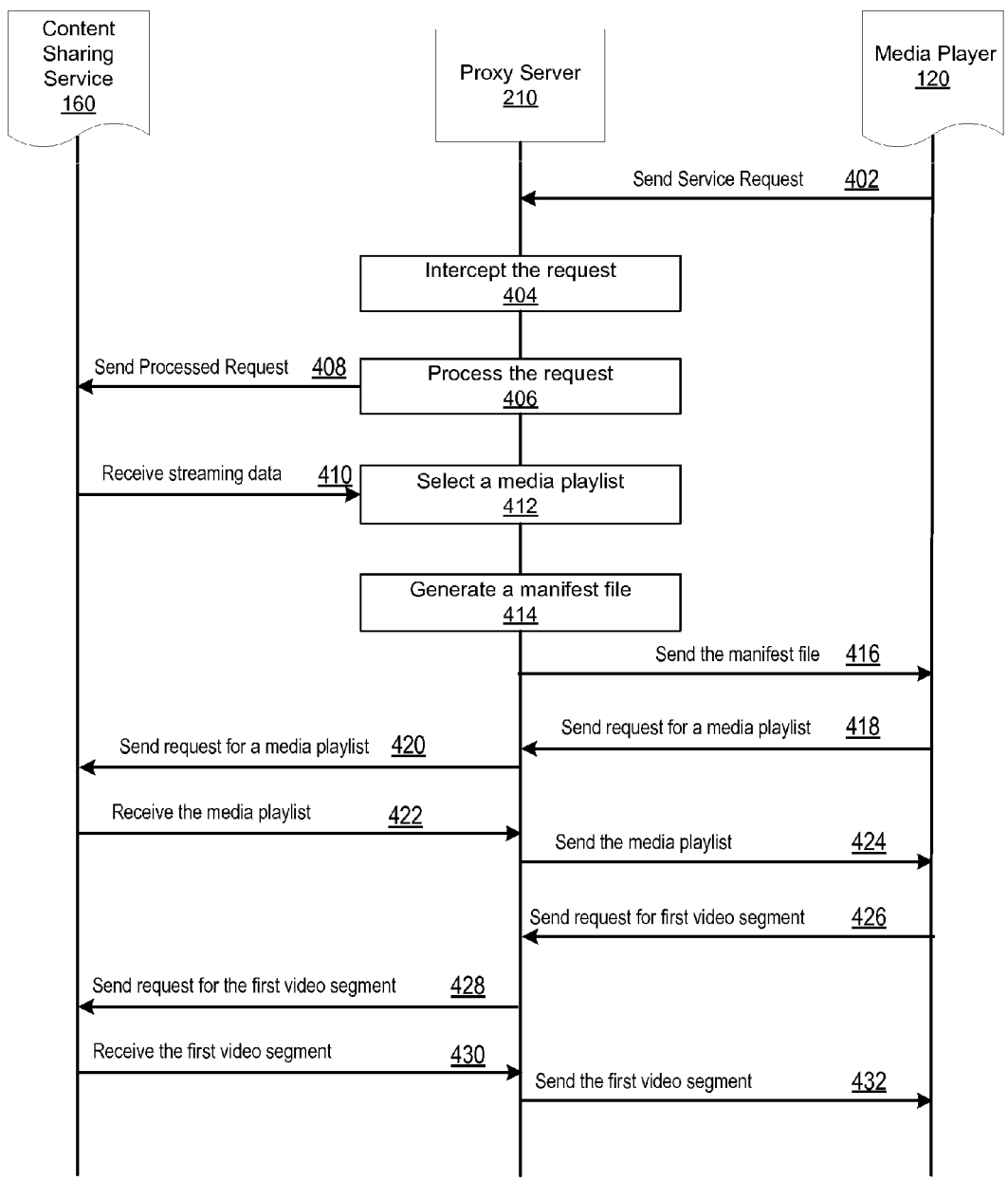
FIG. 4 is an interaction diagram illustrating the operation of enhancing streaming video playback according to one embodiment.

FIG. 4 is an interaction diagram illustrating the operation of enhancing streaming video playback by the streaming video playback system 130 according to one embodiment. In the embodiment illustrated in FIG. 4, the streaming video playback system 130 has a proxy server 210 for a media player 120 of a client device. The media player 120 sends requests for streaming data to the content sharing service 160. The proxy server 210 communicates with the content sharing service 160 as a proxy for the media player 120.

The media player 120 sends 402 a request for a streaming video to the content sharing service 160. The proxy server 210 intercepts 404 the request, processes 406 the request and sends 408 the processed request to the content sharing service 160. The proxy server 210 may transform the file format of the request (e.g., m3u8) such that the proxy server 210 is able to receive the streaming data in an internal representation file format for compact representation of the request. The proxy server 210 may also process the request from the media player 120 so that the processed request is suitable for API functions calls to the content sharing service 160.

The proxy server 210 receives 410 streaming data from the content sharing service 160, where the streaming data include a master playlist identified by a URL and one or more media playlists. Each media playlist represents an available streaming video in a particular visual quality measured by, for example, bit rate, resolution and other visual features of the streaming video. Each media playlist includes a list of URLs for video segments of a corresponding representation of the streaming video.

The proxy server 210 selects 412 a media playlist based on user input or network conditions (e.g., current bit rate for streaming the video from the content sharing service 160). Alternatively, the proxy server 210 may include all available media playlists of the streaming video in a manifest file. The proxy server 210 generates 414 a manifest file based on the selected media playlist and sends 416 the manifest file to the media player 120.

The media player 120 sends 418 a request for a media playlist selected by the proxy server 210. The proxy server 210 intercepts the request and sends 420 the request to the content sharing service 160. Upon receiving 422 the requested media playlist from the content sharing service 160, the proxy server 210 sends 424 the media playlist to the media player 120, where the media playlist includes a list of URLs of video segments of the streaming video.

The media player 120 sends 426 a request for the first video segment on the media playlist, where the request identifies a URL for downloading the first video segment from the content sharing service 160. The proxy server 210 intercepts the request, and sends 428 the request to the content sharing service 160. Upon receiving 430 the first video segment from the content sharing service 160, the proxy server 210 stores the first video segment in a local storage or sends 432 the first video segment to the media player 120 for playback.

The streaming video playback system 130 generates locally a manifest file associated with a streaming video for a media player of a client device. The locally generated manifest file helps reduce startup time for the media player because the manifest file provides metadata needed to generate HLS based master playlists and media playlists locally on the client device. The locally generated manifest file also provides better adaptive bit rate control by enabling pre-fetching of video segments of a streaming video and caching during playback. The streaming video playback system 130 reduces the size of media playlist transmitted to a content sharing service using index of the last video segment and makes it practical to have DVR-able live video streaming with a larger seek window.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for playing back video content, the method comprising:

detecting, by a proxy server, a request in a first file format for a video from a media player to a content sharing service;

modifying, by the proxy server, the request from the first file format to a second file format, streaming data in the second file format requiring less bandwidth for transmitting the streaming data from the content sharing service than required in the first file format;

providing, by the proxy server on behalf of the media player, the modified request for the video, to the content sharing service;

receiving, by the proxy server, streaming data associated with the video in the second file format from the content sharing service in response to the modified request;

generating, by the proxy server, a manifest file based on the received streaming data associated with the video received from the content sharing service, the manifest file comprising a master playlist and a plurality of media playlists associated with the requested video, the master playlist including a universal resource locator (URL) of the requested video in a single representation, and each media playlist of the plurality of media playlists identifying a representation of the requested video in a particular visual quality and including a plurality of video segments for the representation of the requested video;

providing, by the proxy server, the manifest file to the media player for downloading content of the requested video; and responsive to the media player fetching a video segment of the requested video, determining, by the proxy server, a representation of the requested video to choose from the plurality of the media playlists.

2. The method of claim 1, wherein the streaming data associated with the video includes a universal resource locator (URL) of the video provided by the content sharing service.

3. The method of claim 1, wherein generating, by the proxy server, the manifest file based on the received streaming data associated with the video comprises:

parsing the received streaming data to generate one or more playlists associated with the requested video.

4. The method of claim 1, wherein a media playlist of the plurality of media playlists comprises a list of locations of video segments of the video identified by the media playlist and a video segment represents a portion of content of the video.

5. The method of claim 1, wherein the visual quality of the requested video is measured by one or more visual features associated with the requested video, the visual features comprising at least one of the following:

bit rate to represent the video;
resolution of the video;
number of frames per second;
encoding format of the video; and
peak signal-to-noise ratio of the video.

6. The method of claim 1, wherein the plurality of media playlists associated with the video are in HTTP Live Streaming (HLS) format and are supported by a HLS streaming protocol.

7. The method of claim 1, wherein determining, by the proxy server, a representation of the requested video further comprises:

determining, by the proxy server, a representation of the requested video based on input from a user of the media player; and adaptively updating, by the proxy server, the representation based on a current bit rate for streaming the video segments of the video in the determined representation.

8. The method of claim 1, further comprising:

tracking, by the proxy server, an index of a last video segment of the video in a determined representation;

detecting, by the proxy server, a request from the media player for video segments of the video in the determined representation;

providing, by the proxy server, a modified request for the video segments to the content sharing service, the modified request including the index of the last video segment in the determined representation;

receiving, by the proxy server, one or more video segments from the content sharing service, the received video segments representing content of the video subsequent to the content represented by the last video segment; and providing, by the proxy server, the received one or more video segments of the video to the media player.

9. The method of claim 1, further comprising:

selecting, by the proxy server, a representation of the video;

pre-fetching, by the proxy server, one or more video segments of the video in the selected representation; and storing, by the proxy server, the pre-fetched video segments in a local storage.

10. The method of claim 1, wherein the streaming data in the second file format is more compactly represented by the second file format than by the first file format.

11. A non-transitory computer readable medium storing executable computer program instructions for playing back video content, the computer program instructions comprising instructions for:

detecting, by a proxy server, a request in a first file format for a video from a media player to a content sharing service;

modifying, by the proxy server, the request from the first file format to a second file format, streaming data in the second file format requiring less bandwidth for transmitting the streaming data from the content sharing service than required in the first file format;

providing, by the proxy server on behalf of the media player, the modified request for the video, to the content sharing service;

receiving, by the proxy server, streaming data associated with the video in the second file format from the content sharing service in response to the modified request;

generating, by the proxy server, a manifest file based on the received streaming data associated with the video received from the content sharing service, the manifest file comprising a master playlist and a plurality of media playlists associated with the requested video, the master playlist including a universal resource locator (URL) of the requested video in a single representation, and each media playlist of the plurality of media playlists identifying a representation of the requested video in a particular visual quality and including a plurality of video segments for the representation of the requested video;

providing, by the proxy server, the manifest file to the media player for downloading content of the requested video; and responsive to the media player fetching a video segment of the requested video, determining, by the proxy server, a representation of the requested video to choose from the plurality of the media playlists.

12. The computer readable medium of claim 11, wherein the streaming data associated with the video includes a universal resource locator (URL) of the video provided by the content sharing service.

13. The computer readable medium of claim 11, wherein the computer program instructions for generating, by the proxy server, the manifest file based on the received streaming data associated with the video comprise instructions for:
parsing the received streaming data to generate one or more playlists associated with the requested video.

14. The computer readable medium of claim 11, wherein a media playlist of the plurality of media playlists comprises a list of locations of video segments of the video identified by the media playlist and a video segment represents a portion of content of the video.

15. The computer readable medium of claim 11, wherein the visual quality of the requested video is measured by one or more visual features associated with the video, the visual features comprising at least one of the following:
bit rate to represent the video;
resolution of the video;
number of frames per second;
encoding format of the video; and
peak signal-to-noise ratio of the video.

16. The computer readable medium of claim 11, wherein the plurality of media playlists associated with the video are in a HTTP Live Streaming (HLS) format and are supported by a HLS streaming protocol.

17. The computer readable medium of claim 11, wherein the computer program instructions for determining, by the proxy server, a representation of the requested video further comprise instructions for:
determining, by the proxy server, a representation of the video based on input from a user of the media player; and
adaptively updating, by the proxy server, the representation based on a current bit rate for streaming the video segments of the video in the determined representation.

18. The computer readable medium of claim 11, further comprising computer program instructions for:
tracking, by the proxy server, an index of a last video segment of the video in a determined representation;
detecting, by the proxy server, a request from the media player for video segments of the video in the determined representation;
providing, by the proxy server, a modified request for the video segments to the content sharing service, the modified request including the index of the last video segment in the determined representation;
receiving, by the proxy server, one or more video segments from the content sharing service, the received video segments representing content of the video subsequent to the content represented by the last video segment; and
providing, by the proxy server, the received one or more video segments of the video to the media player.

19. The computer readable medium of claim 11, further comprising computer program instructions for:
selecting, by the proxy server, a representation of the video;
pre-fetching, by the proxy server, one or more video segments of the video in the selected representation; and
storing, by the proxy server, the pre-fetched video segments in a local storage.

20. The computer readable medium of claim 11, wherein the streaming data in the second file format is more compactly represented by the second file format than by the first file format.

21. A computer system for playing back video content, the system comprising:
a proxy server, comprising:
a monitoring module for:
detecting a request in a first file format for a video from a media player to a content sharing service;
modifying the request from the first file format to a second file format, streaming data in the second file format requiring less bandwidth for transmitting the streaming data from the content sharing service than required in the first file format;
providing, on behalf of the media player, the modified request for the video to the content sharing service; and
receiving streaming data associated with the video from the content sharing service in response to the modified request; and
a manifest generation module for:
generating a manifest file based on the received streaming data associated with the video received from the content sharing service, the manifest file comprising a master playlist and a plurality of media playlists associated with the requested video, the master playlist including a universal resource locator (URL) of the requested video in a single representation, and each media playlist of the plurality of media playlists identifying a representation of the requested video in a particular visual quality and including a plurality of video segments for the representation of the requested video;
providing the manifest file to the media player for downloading content of the requested video; and
responsive to the media player fetching a video segment of the requested video, determining a representation of the requested video to choose from the plurality of the media playlists.

22. The computer system of claim 21, wherein the streaming data associated with the video includes a universal resource locator (URL) of the video provided by the content sharing service.

23. The computer system of claim 21, wherein the manifest generation module is further for:
parsing the received streaming data to generate one or more playlists associated with the requested video.

24. The computer system of claim 21, wherein a media playlist comprises a list of locations of video segments of the video identified by the media playlist and a video segment represents a portion of content of the video.

25. The computer system of claim 21, wherein the visual quality of the requested video is measured by one or more visual features associated with the video, the visual features comprising at least one of the following:
bit rate to represent the video;
resolution of the video;
number of frames per second;
encoding format of the video; and
peak signal-to-noise ratio of the video.

26. The computer system of claim 21, wherein the plurality of media playlists associated with the video are in a HTTP Live Streaming (HLS) format and are supported by a HLS streaming protocol.

27. The computer system of claim 21, wherein the manifest generation module is further for:
- determining a representation of the requested video based on input from a user of the media player; and
- adaptively updating the representation based on a current bit rate for streaming the video segments of the video in the determined representation.

28. The computer system of claim 21, further comprising a content index module for:
- tracking an index of a last video segment of the video in a determined representation;
- detecting a request from the media player for video segments of the video in the determined representation;
- providing a modified request for the video segments to the content sharing service, the modified request including the index of the last video segment in the determined representation;
- receiving one or more video segments from the content sharing service, the received video segments representing content of the video subsequent to the content represented by the last video segment; and
- providing the received one or more video segments of the video to the media player.

29. The computer system of claim 21, further comprising a stream selection module for:
- selecting a representation of the video;
- pre-fetching one or more video segments of the video in the selected representation; and
- storing the pre-fetched video segments in a local storage.

30. The computer system of claim 21, wherein the streaming data in the second file format is more compactly represented by the second file format than by the first file format.

* * * * *